United States Patent
Cantillo et al.

(10) Patent No.: US 8,582,600 B2
(45) Date of Patent: Nov. 12, 2013

(54) METHOD AND DEVICE FOR DELINEATING A DATA STREAM AND COMMUNICATION SYSTEM COMPRISING SAID DEVICE

(75) Inventors: Juan Cantillo, Toulouse (FR); Jérôme Lacan, Toulouse (FR); Isabelle Buret, Toulouse (FR); Fabrice Arnal, Toulouse (FR)

(73) Assignee: Thales, Neuilly sur Seine (FR)

( * ) Notice: Subject to any disclaimer, the term of this patent is extended or adjusted under 35 U.S.C. 154(b) by 449 days.

(21) Appl. No.: 12/918,588

(22) PCT Filed: Feb. 20, 2009

(86) PCT No.: PCT/EP2009/052059
§ 371 (c)(1),
(2), (4) Date: Sep. 21, 2010

(87) PCT Pub. No.: WO2009/103797
PCT Pub. Date: Aug. 27, 2009

(65) Prior Publication Data
US 2011/0032949 A1  Feb. 10, 2011

(30) Foreign Application Priority Data
Feb. 22, 2008 (FR) ........................ 08 00968

(51) Int. Cl.
*H04J 3/22* (2006.01)
(52) U.S. Cl.
USPC ............ 370/469; 370/471; 370/474; 370/476
(58) Field of Classification Search
USPC ............ 370/395.31, 469, 471, 474, 389, 476; 380/255; 710/52
See application file for complete search history.

(56) References Cited

U.S. PATENT DOCUMENTS 5,745,488 A * 4/1998 Thompson et al. ...... 370/395.31
6,041,054 A * 3/2000 Westberg ...................... 370/389
(Continued)

FOREIGN PATENT DOCUMENTS

| EP | 0915588 | 5/1999 |
| EP | 1067740 | 1/2001 |
| WO | 2008005199 | 1/2008 |

OTHER PUBLICATIONS

Ueda, H., et al.: "Reducing misframe frequency for HEC-based variable length frame suitable for IP services," ICC 2001, 2001 IEEE International Conference on Communications, Jun. 11, 2001, XP010553517, pp. 1196-1200.

(Continued)

*Primary Examiner* — Brian D Nguyen
*Assistant Examiner* — Toan Nguyen
(74) *Attorney, Agent, or Firm* — Baker & Hostetler LLP (57) ABSTRACT

A method for delineating a data stream transmitted by a communication system using a protocol stack includes: analyzing the redundancy of sequences, the content of which is set on one or more layers in a protocol stack to delineate packets, errored or not, in a continuous data stream; the method to this end including searching in the receiver for sequences corresponding to a known sequence SP present in the received stream, and doing so by detecting sequences similar to this known sequence, the non-similar sequences not being retained; the method further including, in the presence of similar sequences, storing their position to determine the start of the packets.

14 Claims, 9 Drawing Sheets

(56) References Cited

U.S. PATENT DOCUMENTS

| | | |
|---|---|---|
| 6,819,679 B1 | 11/2004 | Kerns et al. |
| 6,876,671 B1 * | 4/2005 | Rambaud et al. ............. 370/474 |
| 6,948,013 B2 * | 9/2005 | Leyrer ............................ 710/52 |
| 2004/0100992 A1 * | 5/2004 | Erlenborn et al. ............ 370/474 |
| 2006/0050884 A1 * | 3/2006 | O'Brien ........................ 380/255 |

OTHER PUBLICATIONS

Shark, L. K., et al.: "New high-speed adaptive frame synchronisers incorporating postdetection processing techniques," Institution of Electrical Engineers (GB) Proceedings I—Solid-State & Electron Devices, vol. 138, No. 4, Aug. 1, 1991, XP000259816, pp. 269-279.

* cited by examiner

METHOD AND DEVICE FOR DELINEATING A DATA STREAM AND COMMUNICATION SYSTEM COMPRISING SAID DEVICE

CROSS-REFERENCE TO RELATED APPLICATIONS

This application is a National Stage of International patent application PCT/EP2009/052059, filed on Feb. 20, 2009, which claims priority to foreign French patent application No. FR 08 00968, filed on Feb. 22, 2008, the disclosures of which are incorporated by reference in their entirety.

FIELD OF THE INVENTION

The invention relates to a method for delineating a data stream transmitted via a communication channel. The invention applies to any digital communication system. The invention applies to satellite communications and to ATM-over-ADSL links.

BACKGROUND OF THE INVENTION

The term "delineation", also referred to as "packet synchronization", should be understood to mean the step consisting in determining, in a continuous data stream, the length of the packets and their limits, essential in reception.

The current delineation techniques require integrity of the data. When the link is not reliable enough, a transmission error correction step usually precedes the delineation. Furthermore, the current techniques demand, for example, the addition of information such as length information, pointers, in the payload that consumes bandwidth on the transmitted stream.

Figure 1:
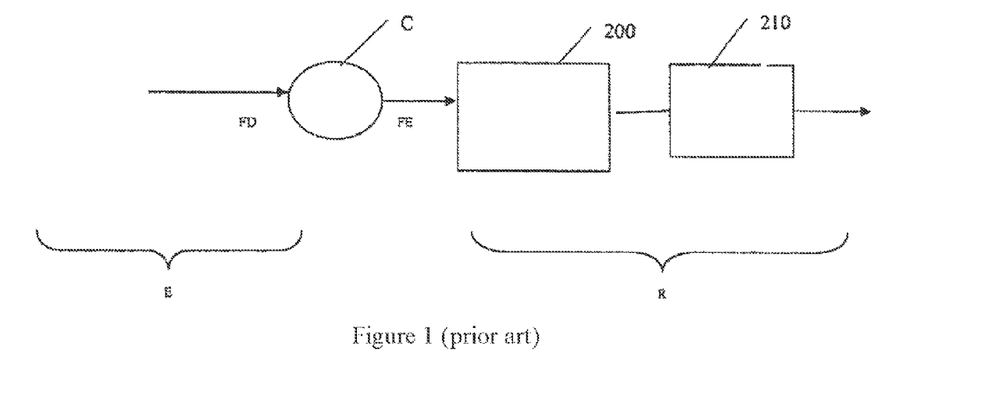
FIG. 1 is a schematic representation of a data stream communication system with a transmission chain according to the prior art.

FIG. 1 is a schematic representation of a communication system implementing a delineation method according to the state of the art. The communication system comprises a transmission chain with, at the transmit end E, the formation of the transmitted stream FD, a communication channel C and, at the receiving end R, the processing of the received stream FE. In the transmit part, the stream is, for example, coded by a FEC coder then modulated. This stream FD is transmitted via the communication channel C then received by a recipient receiver R. Upon reception, the stream is demodulated and decoded by a FEC decoder 200. The delineation device 210 for the stream is placed after the transmission error correction function which, in this example, is handled by the FEC decoder. In practice, the FEC technique consists, for the sender, in adding redundancy to the payload in order to enable the recipient receiver to detect and correct some of the inevitable transmission errors.

In all cases, the existing techniques are based on the addition of control or redundancy data to the payload stream and delineation following the transmission error correction because this step requires integral data. Typical examples are the delineation in the cases of the MPE/MPEG2, ULE/MPEG2 or AAL5/ATM (Unidirectional Lightweight Encapsulation (ULE); Multi Protocol Encapsulation (MPE); ATM adaptation Layer (AAL5)) protocols.

The aim of the present invention is to remedy this drawback by proposing a non-intrusive, robust delineation solution that can be applied equally to an integral data stream and to a data stream including transmission errors, without the need to add data to the transmitted payload stream (i.e., neither redundancy nor control information).

In the case of a delineation step on an integral data stream, that is to say, at the level where the conventional mechanisms operate, the delineation according to the inventive method can be done without adding redundancy.

In the case of a delineation step on a data stream without transmission error correction, the delineation can also take place, because this step is, according to the invention, made independent of the need for data integrity. The packets of error-tolerant applications such as Voice-over-IP (VoIP) can be transmitted to the higher layers even if errors are present. The adaptation layers such as MPE, ULE or GSE (Generic Stream Encapsulation) can, with this method, have information to improve on delineation applied by a mechanism other than that of the present invention.

SUMMARY OF THE INVENTION

The subject of the present invention is a method for delineating a data stream belonging to a given protocol stack implementing multilayer techniques.

In the protocol stacks, numerous items of control information are replicated in all the packets belonging to the same logical streams.

According to the invention, the method consists in exploiting the natural redundancy of these streams, the main manifestation of which is the predictable and recurrent repetition of sequences with a fixed content, these so-called known sequences SP being constructed from control information characteristic of the different layers of the protocol stack. The redundancy, according to the invention, is used to delineate the stream; the method to this end consisting in searching, on a received data stream, for the original positions of the known sequences SP, and doing so by detecting sequences similar to this known sequence SP, the non-similar sequences, that is to say different sequences, not being retained.

Hereinbelow, the term "sequence" should be understood to be both a discrete sequence (that is to say, a series of binary or other symbols, resulting from quantized information), and a signal portion corresponding to a discrete sequence, depending on whether the incoming stream is processed after demodulation or before. The term "binary symbol" should be understood to be a bit, a non-binary symbol being represented by a group of bits.

The subject of the present invention is, more particularly, a method for delineating a data stream transmitted by a communication system using a multilayer protocol stack, comprising a receiver, mainly characterized in that the method comprises the following steps:

reception of an incoming data stream comprising data packets with protocol header fields, the content of which is constant for all the data packets of the stream, the construction of at least one known sequence SP from the constant content protocol fields, the search for and detection of, in the receiver, sequences similar to the known sequence SP, the non-similar sequences not being retained, the determination of the positions of the similar sequences that have been detected, the storage of the positions of the similar sequences that have been detected in order to determine information with which to delineate the stream.

The information that is used to delineate may be, for example, the position of a start of a packet or a length between two sequences that have been detected.

Storing the position entails saving the position in the stream of successive similar sequences in order to deduce the start of packets.

The search for a known sequence SP in the incoming stream includes the opening of an analysis window W of a length equal to the length of the known sequence SP, the calculation of a similarity measurement between an analyzed sequence and the known sequence SP, the calculation of a threshold η relating to the similarity measurement, a similar sequence being detected when the measured similarity is greater than or equal to the threshold η.

In the case of binary signals, this similarity measurement may correspond, for example, to a Hamming distance-type distance calculation. In the case of real or quantized analog signals, this measurement may correspond, for example, to a correlation-type calculation.

The threshold η is chosen in such a way as to obtain a maximum probability of recovery of the known sequences PSR, this threshold η then corresponding to an estimation of the optimum $\eta_{opt}$.

The search for a known sequence is performed continuously by sliding the analysis window by one position upon each displacement.

The displacement by one position corresponds, for example, to a symbol-by-symbol, or byte-by-byte, or bit-by-bit displacement in the incoming stream.

The invention also relates to a device for delineating a data stream transmitted by a communication system using a multilayer protocol stack, mainly characterized in that it comprises:

an input for receiving a data stream comprising data packets with protocol header fields, the content of which is constant for all the data packets of the stream, at least one known sequence SP constructed from the constant content protocol fields, means for searching for and detecting sequences similar to the known sequence SP, the non-similar sequences not being retained, means for determining positions of the similar sequences that have been detected, means for storing the position of the similar sequences that have been detected in order to determine information with which to delineate the stream.

The means for searching for the sequences corresponding to the known sequence SP and detecting similar sequences comprise:

a window W of length equal to the length of the known sequence SP, in order to analyze, in the stream, the sequences circulating in the window, means for calculating a detection threshold η, means of calculating a similarity measurement between an analyzed sequence and the known sequence SP and means of detecting a similar sequence, the detection occurring when the measured similarity is greater than or equal to the threshold η.

The analysis window is a sliding window that is displaced from a position i to a position i+1 after each analysis of a sequence of predetermined length F, formed by received symbols indexed from i to i+F−1. The indices i and i+F−1 correspond to the minimum and maximum limits establishing the length of the analysis window W; when the sequence SP is continuous then the minimum and maximum limits give the size of the sequence SP (the length F corresponds to the length of the sequence SP).

The invention also relates to a data stream communication system comprising a reception chain mainly characterized in that said reception chain comprises a delineation device, as described previously.

In such communication systems, the reception chain usually comprises a demodulator and an FEC decoder performing transmission error correction. The delineation device can be placed either before or after the error correction function.

The invention can be applied, for example, to satellite communication systems.

The invention can be applied, for example, to links using ATM-over-ADSL.

BRIEF DESCRIPTION OF THE DRAWINGS

Other particular features and advantages of the invention will become clearly apparent upon reading the following description which is given as an illustrative and nonlimiting example, and in light of the figures in which:

FIGS. 7 to 10 also illustrate the curves of probability of false alarm in delineation Pfa. The success of the delineation is measured directly by the Pfa.

FIG. 11 is a hexadecimal representation of a series of incoming packets in the case of an FTP/TCP/IP/Ethernet protocol stack, captured at Ethernet level, showing the existence of repeated sequences in the control information of each packet and possibly constituting the known sequence SP.

DETAILED DESCRIPTION

The delineation method according to the invention applies to the communication systems that use protocol stacks. Nonexhaustive examples of protocol stacks to which this method applies are TCP/IP or UDP/IP. It applies to any digital communication system and in particular to satellite communication systems and ATM-over-ADSL links.

In a data stream transmitted by a protocol stack, one or more known sequences SP are transmitted.

The known sequences SP are sequences that contain "static" information fields, that is to say, fields whose content is constant and that can be known to the receiver or learned by the receiver for all the packets of the stream. In the case where the known sequences include fields whose content is learned by the receiver, the learning can be done by analyzing the fields of the headers of the first data packets of an incoming stream. During the learning process, the receiver works out the sequence that is used, which gives the possibility of using different sequences in the incoming stream. Alternatively, the sequences SP may comprise a combination of sequences including fields whose content is known to the receiver and fields whose content is learned by the receiver. The sequences SP may be made up of subsets of bits belonging to different header fields of a number of protocols belonging to different communication layers such as, for example, the addresses of the MAC or IP levels of the sending source or of the receiver, TCP or UDP ports, the protocol type or its version. This then makes it possible to construct a longer known sequence and thus obtain clearly enhanced correct detection probabilities. The bits of a subset are not necessarily contiguous, but their relative position in the header is known. Moreover, when the receiver receives a number of different incoming streams in parallel, via a multiplexer for example, the receiver can search simultaneously for a number of different known sequences, each known sequence being associated with one of the streams.

According to the delineation method, the stream transmitted via the communication channel C of the transmission chain and incoming at the receiving end R is analyzed so as to search for the known sequences SP of the stream.

The data of the stream FD processed according to the method can be in the form of binary symbols or in the form of real or quantized analog data.

The method includes the determination of a detection threshold $\eta$ for known sequences SP. The detection threshold $\eta$ is chosen so as to have a maximum probability of recovery of the known sequences PSR. The selected threshold is preferably an optimum threshold $\eta_{opt}$, which can be estimated by analyzing the received stream. This optimum threshold $\eta_{opt}$ takes into account the average number L of symbols between two occurrences of the known sequence SP in the stream (the average length of the packets) and the state of the communication channel C. The state of the communication channel is reflected in an estimated variable $\epsilon$ corresponding to the noise conditions. The value of L and the state of the channel are estimated values obtained, for example, by a conventional estimator or by other methods.

In the case of errors introduced by transmission, the method makes it possible to detect in the stream sequences that are similar to the expected known sequences SP, that is to say, sequences that are identical or very close, this proximity being established on the basis of a predetermined similarity criterion; the non-similar sequences, that is to say different sequences, are not retained.

When an analyzed sequence satisfies the similarity criterion, a so-called "similar" sequence is detected. This similarity criterion is satisfied when the analyzed sequence has a degree of similarity with the known sequence SP greater than or equal to the limit defined by the estimation of the optimum detection threshold $\eta_{opt}$.

The method includes the detection of errored known sequences SP, which corresponds to the detection of similar sequences.

The method includes the storage of the position of these sequences in order to determine information that can be used for the delineation. This information is, for example, the start position of a packet or a length between two sequences from which the start of a packet can be deduced.

The analysis of the incoming stream FE is carried out by means of a sliding window W. The sliding window is displaced in the incoming stream from a position i to a position i+1 after each analysis of a sequence of predetermined length F made up of the received symbols indexed from i to i+F−1.

Storing the position entails saving the spatial position of successive similar sequences that have been detected in order to deduce information such as the start of packets. The spatial position of similar (or SP) sequences in the stream is defined by the number (rank) of the first bit.

When the stream data processed by the delineation device are in the form of symbols, and the similar sequence does not begin at the start of a header, the start position of the packet is estimated by deducing, from the position of the similar sequence, the number of symbols corresponding to this offset.

The number of symbols between two detections of successive similar sequences is stored in order to determine length information between two sequences that have been detected. The "length" information can, for example, be compared to that obtained by conventional mechanisms.

Figure 2:
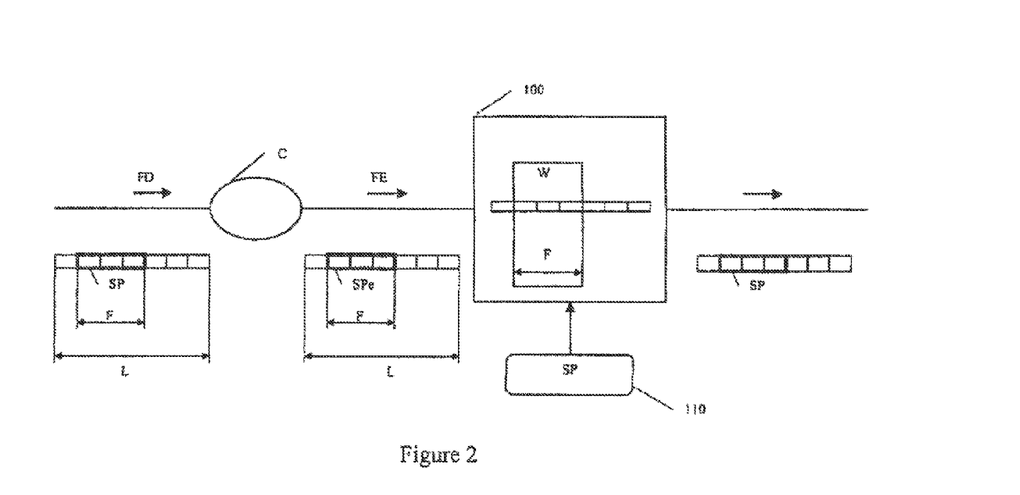
FIG. 2 is the schematic representation of a delineation device 100 placed on a transmission chain according to the invention.

FIG. 2 is a schematic representation of a delineation device 100 placed on a transmission chain using a protocol stack and containing a communication channel C. The device 100 receives a stream FE of data packets transmitted via the channel C.

The estimated average length of the packets is L,

The size or length of the known sequences SP is F,

At the channel output, the known sequences SP may have been transmitted with errors, as is illustrated by the sequence SPe.

The device 100 receives from the higher layers 110 information relating to the fields that make up the known sequence SP for all the packets of the stream. These data are used to determine the known sequence SP to be searched for in the stream by the device 100.

The device 100 has a window W for analyzing the received data. The sliding window W is a window that is displaced from a position i to a position i+1 after each analysis of a sequence of predetermined length F made up of received symbols indexed from i to i+F−1.

Figure 3:
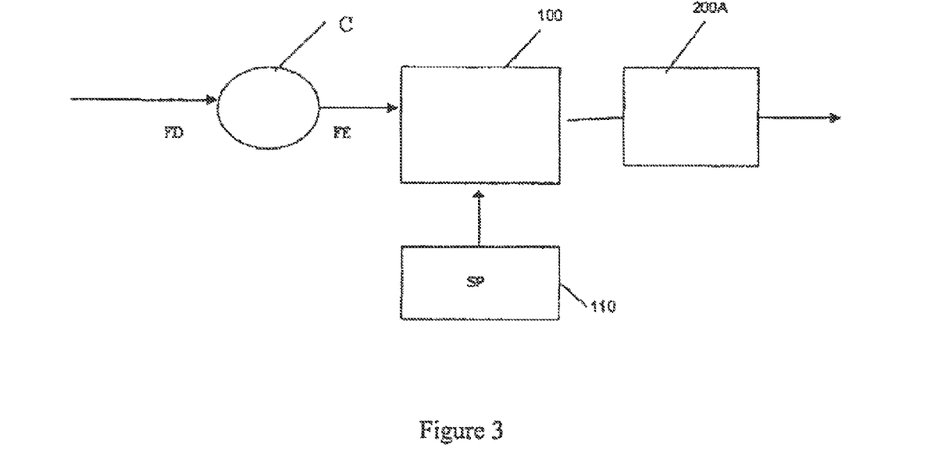
FIG. 3 is the schematic representation of a data stream communication system in which the delineation device 100 is placed before error correction 200A.

FIG. 3 represents a communication system as represented in FIG. 1, comprising a delineation device 100 according to the invention. In this exemplary embodiment, the device 100 is located before the effort correction system 200A of the reception chain R.

Figure 4:
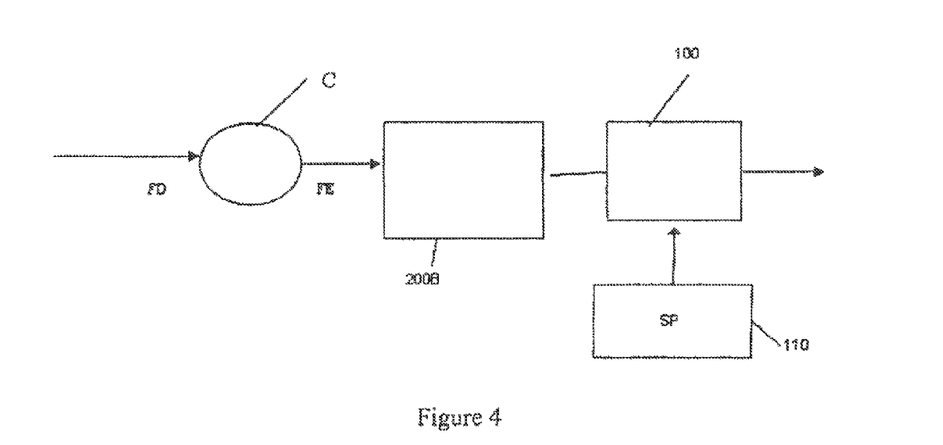
FIG. 4 is the schematic representation of a data stream communication system in which the delineation device 100 is placed after error correction 200B.

FIG. 4 represents a second embodiment of a communication system according to the invention. In this embodiment, the delineation device 100 is placed after the error correction system 200B.

Figure 5:
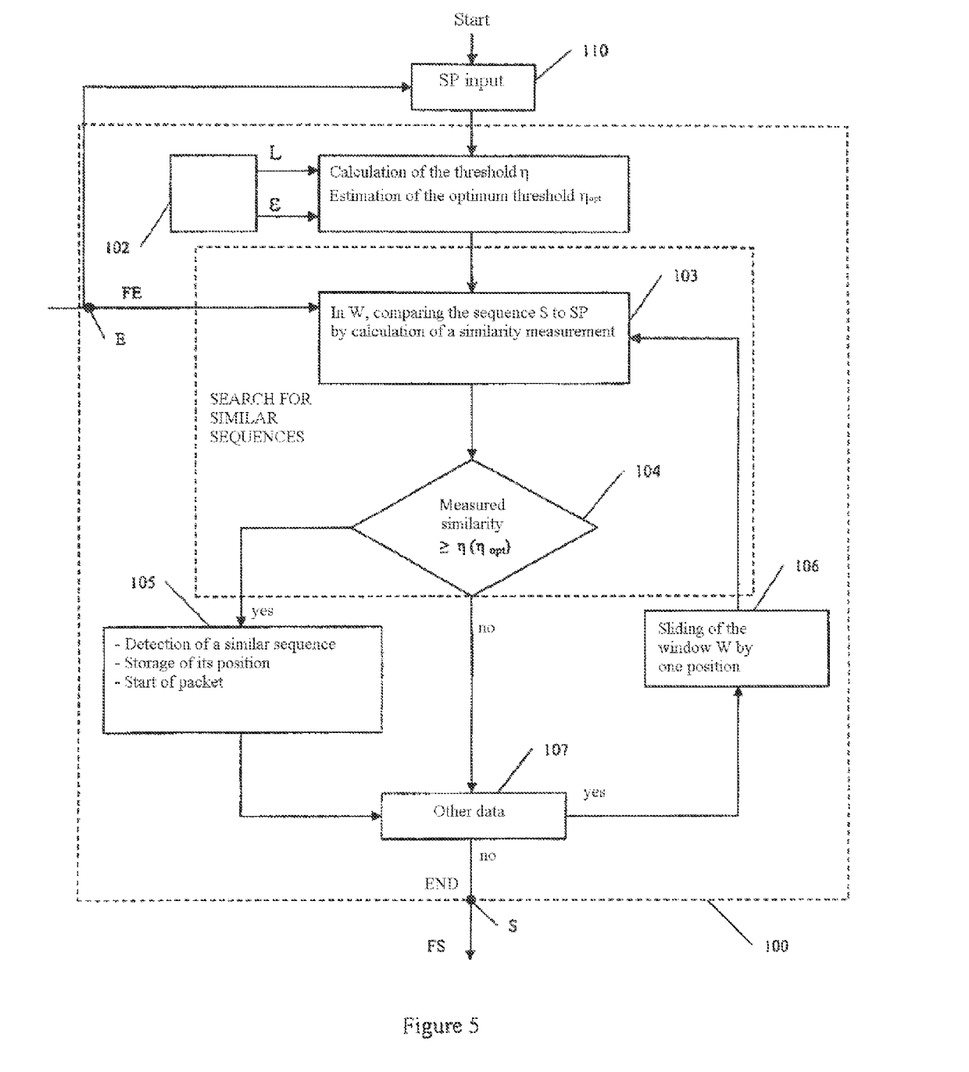
FIG. 5 is a detailed diagram of the steps implemented by the delineation device according to the invention.

FIG. 5 illustrates the steps implemented by the delineation device 100. These steps are described hereinbelow:

110—The upper layers on the receiver R supply the device 100 with information relating to the known sequence SP of the incoming stream FE in order for this device 100 to search for said sequences in the stream FE.

101, 102, 103, 104—The device 100 searches the stream FE for the probable positions of the known sequences by successive comparison of sequences of symbols with the known sequence SP according to a predetermined criterion. The steps implemented are then as follows:

101, 102—The device determines the detection threshold for a known sequence, this threshold corresponding to a satisfactory similarity that makes it possible to reject very different sequences, that is to say, sequences with a similarity below the threshold. For practical reasons, the detection threshold $\eta$ for known sequences SP is chosen in such a way as to maximize the probability of recovery of the known sequences PSR. The chosen threshold is an estimation of an optimum threshold $\eta_{opt}$. This optimum threshold $\eta_{opt}$ takes into account the average number of symbols L between two occurrences of the known sequence (the average length of the packets) and the state of the communication channel C, reflected in the variable $\epsilon$ representing the bit or symbol error rate. The value of L and the state of the channel are estimated values obtained by the estimator 102.

103—The device analyzes the sequence present in the window W, by measuring its similarity to the known sequence SP.

104—The device compares the detection threshold $\eta$ with the measured similarity.

The device 100 detects 105 errored known sequences if there are similar sequences present, that is to say sequences whose measured similarity to the known sequence SP is greater than the threshold $\eta$, and stores the position of these sequences and deduces the start of the packets therefrom.

107—The device checks the end of the stream and slides 106 the analysis window W by one position.

Figure 6:
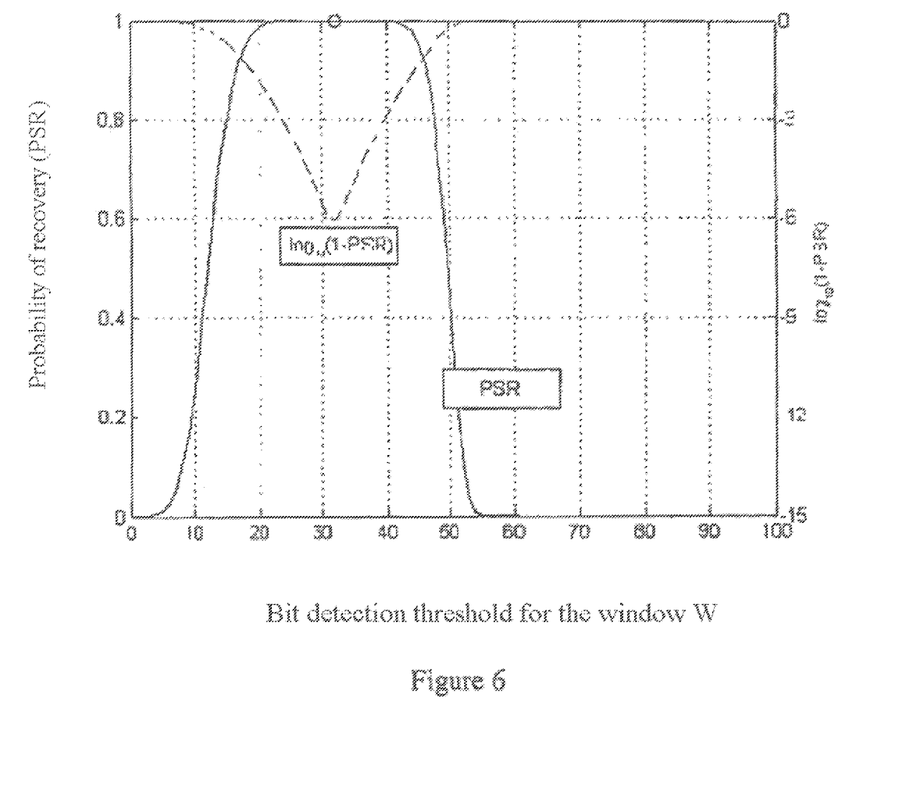
FIG. 6 shows the curve of variation of the probability of recovery from the known sequences of a known sequence in the analysis window as a function of the detection threshold η, according to transmission channel noise conditions, reflected in a variable ε and for a chosen known sequence length F.

FIG. 6 represents the curve of variation PSR as a function of the detection threshold $\eta$ for a known sequence SP length F equal to 16 bytes, and significant noise conditions reflected in a bit error rate $\epsilon$, $\epsilon=10^{-1}$ (1 bit in every 10 errored). In this figure, the broken line represents the logarithmic distance between the probability of recovery PSR of the known sequences and 1, namely: $\log_{10}(1-PSR)$.

Pcd and Pfa will be used hereinbelow respectively to denote the probability of correct detections and the probability of false alarms associated with the device.

In the case where the method is implemented on integral data, $\epsilon=0$, the probability of correct detections Pcd=1 and the probability of false alarms Pfa=$2^{-8F}$. Given F equal to 4 or 5 bytes, Pfa is always below $10^{-10}$. Given F equal to 20 bytes, Pfa is always below $10^{-49}$.

In the case of a non-integral stream (including errors), c is not zero. The curves of variations of PSR of the known sequences illustrated by FIGS. 7 to 10 show different results relating to this case. In these figures, the broken line curves correspond to the curve $10 \log_{10}(Pfa)$, Pfa being practically equal to $[(1-PSR)/(L-1)]$.

Figure 7:
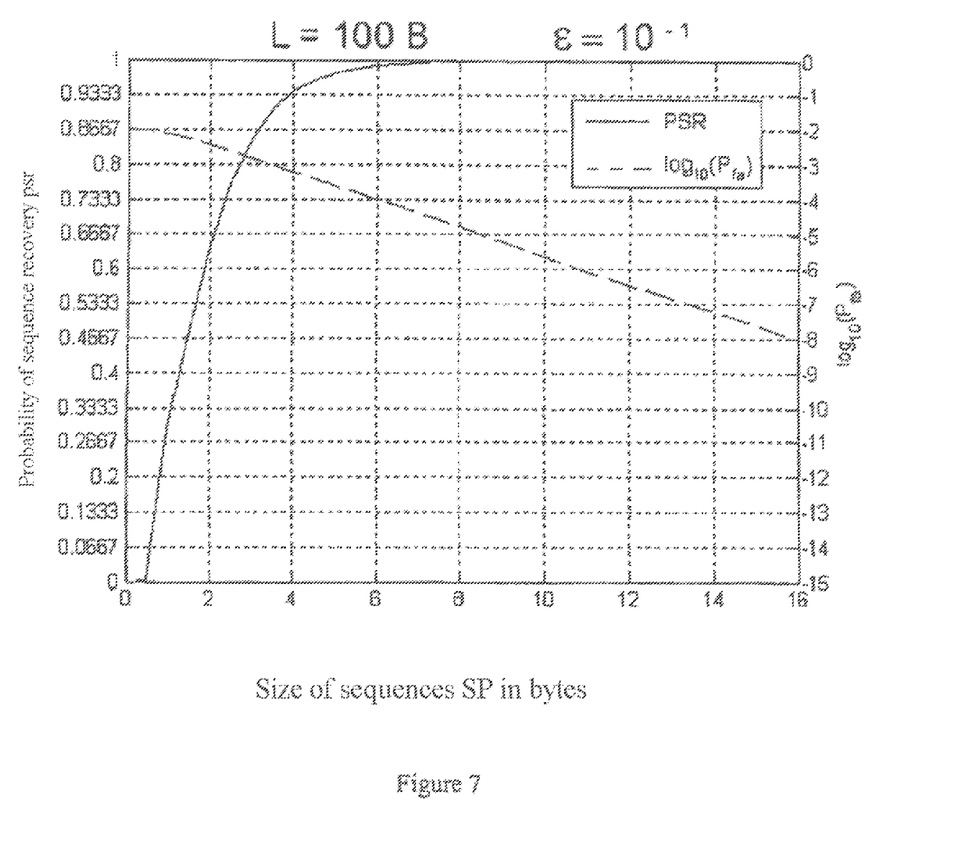
FIG. 7 represents the curve of variation of the probability of recovery from the known sequences of a known sequence in the analysis window as a function of the size F of the known sequence, according to selected channel noise conditions, reflected in a variable ε and a number of symbols L between two successive occurrences of the known sequence in the original stream.
Figure 8:
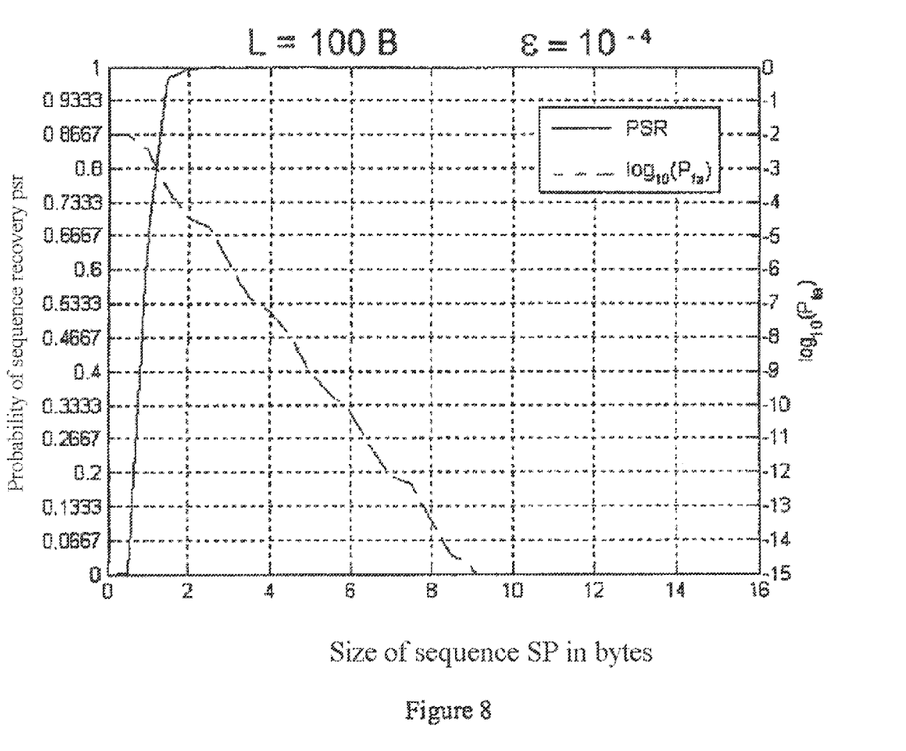
FIG. 8 represents the curve of variation of the probability of recovery from the known sequences of a known sequence in the analysis window as a function of the size F of the known sequence, according to channel noise conditions reflected in a variable ε different from that of FIG. 7 and the same number L of symbols between two successive occurrences of the known sequence in the original stream.
Figure 9:
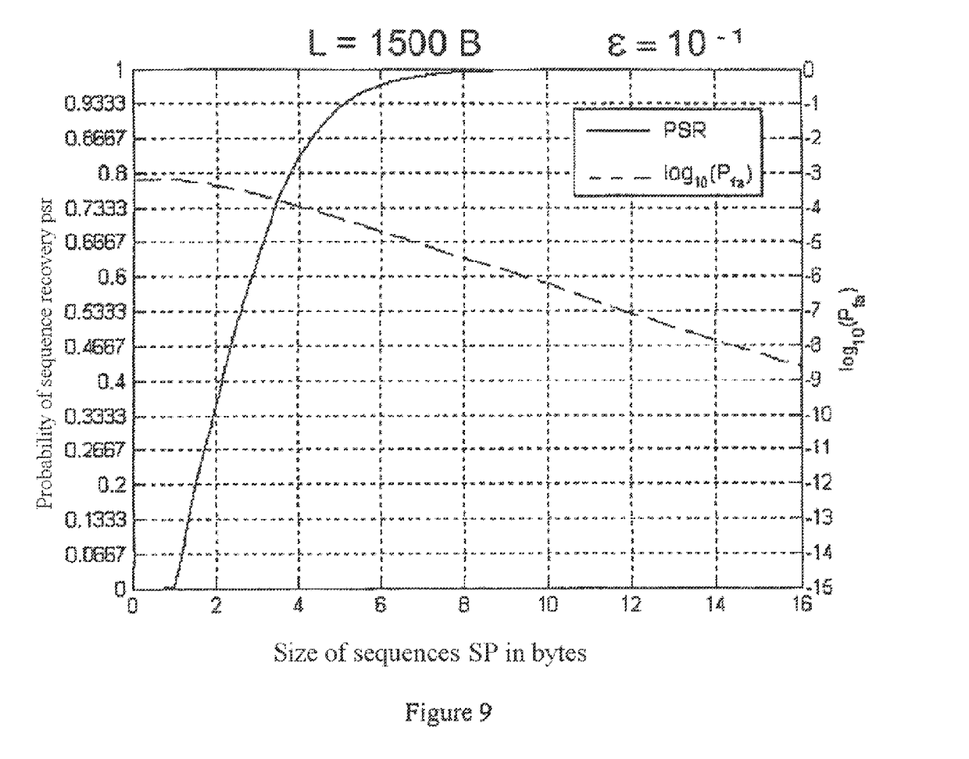
FIG. 9 represents the curve of variation of the probability of recovery from the known sequences of a known sequence in the analysis window as a function of the size F of the known sequence, according to a second number L of symbols between two successive occurrences of the known sequence and selected channel noise conditions reflected in a variable ε.
Figure 10:
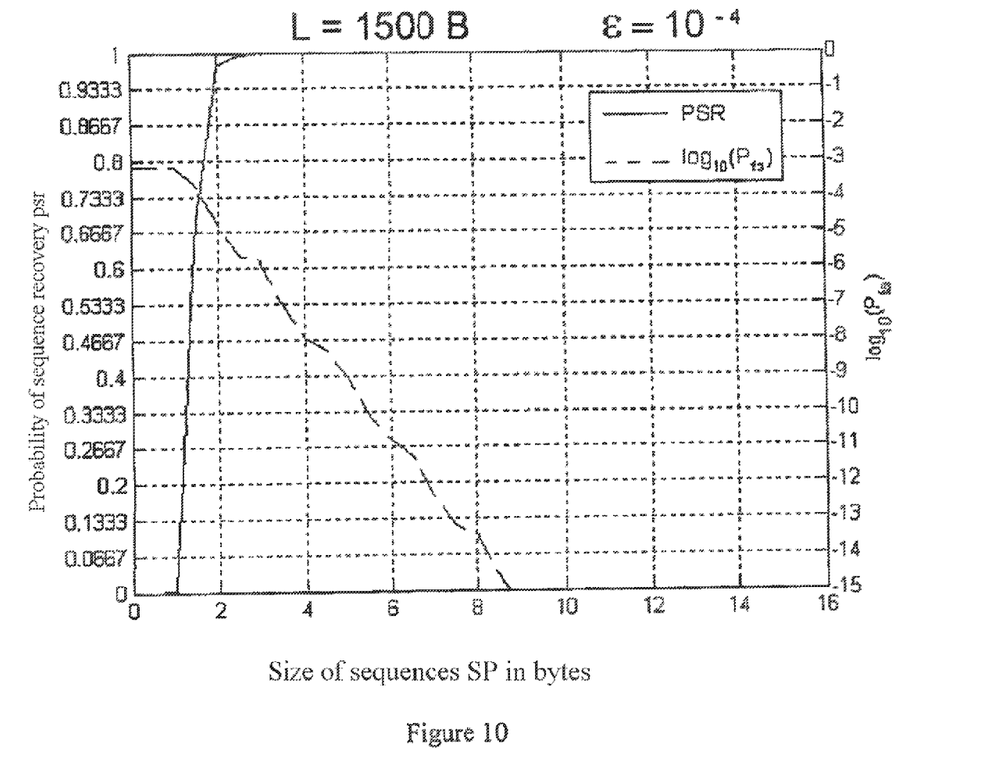
FIG. 10 represents the curve of variation of the probability of recovery from the known sequences of an SP in the analysis window as a function of the size F of the known sequence, according to channel noise conditions reflected in a variable ε different from that of FIG. 9 and the same number L of symbols between two occurrences of the known sequence.

FIGS. 7 and 8 illustrate the curves of variation of PSR and Pfa of a known sequence SP in the analysis window W respectively for bit error rates $\epsilon=10^{-1}$ and $\epsilon=10^{-4}$, and a number of symbols L between two successive occurrences of the known sequence SP (average size of the packets) being 100 bytes. FIGS. 9 and 10 illustrate the curves of variation of PSR and Pfa of a known sequence in the analysis window F, respectively for bit error rates $\epsilon=10^{-1}$ and $\epsilon=10^{-4}$ and a number of symbols L between two successive occurrences of the known sequence SP (average size of the packets) of 1500 bytes.

These figures show that, even when there are errors in the stream, the probability of false alarms Pfa decreases rapidly with the increase in the size of the sequences SP. It can also be seen that, as in the case of an error-free stream, when the size of the sequences SP is conventional, that is to say some tens of bytes, the Pfa is very low.

FIG. 11 illustrates an example in the case of a file transfer using the FTP/TCP/IP/Ethernet protocol stack. This figure represents a hexadecimal extraction from the series of incoming packets captured at the Ethernet level. In the example of the chosen protocol stack, each packet has an Ethernet header, an IP header, a TCP header, and FTP protocol data. These headers comprise, as can be seen, information fields that are constant over all the packets. These are static sequences, that are found distributed over one or more layers of a protocol stack.

The method exploits this feature to search for the known sequences SP based on the knowledge of the protocol stack, in order to determine information necessary to the delineation. This SP search may obviously be performed in parallel on a number of streams (the commonest case for the vast majority of digital communications).

The method exploits the natural redundancy of the data generated by a protocol stack. It is non-intrusive, just as the known delineation methods can be. It can be implemented in any communication system including in satellite communication systems and those that use ATM-over-ADSL links.

The invention claimed is:

1. A method for delineating a data stream transmitted by a communication system using a multilayer protocol stack, comprising a receiver, said method comprising:
    receiving an incoming data stream comprising data packets with protocol header fields, the protocol header fields comprising fields whose content is constant for all the data packets of the incoming data stream;
    constructing, from the received incoming data stream, by a learning process, at least one sequence (SP), the constructed sequence SP comprising subsets of bits whose content is constant and belong to different protocol header fields of the received incoming data stream;
    searching for and detecting, in the incoming data stream, sequences similar to the constructed sequence SP, the non-similar sequences not being retained; and
    determining and storing positions of the similar sequences that have been detected in order to determine information with which to delineate the incoming data stream,
    wherein subsets of bits of the constructed sequence SP have known relative positions,
    wherein the storing of the positions of the similar sequences that have been detected comprises saving said positions in a stream of successive similar sequences in order to deduce a start of packets, and
    wherein, when the data of the incoming data stream are in symbol form, and one of the similar sequences does not begin at a start of a header field and includes an offset relative to the start, the offset corresponding to a number of symbols, the start position of the corresponding packet is estimated by deducing, from the position of said similar sequence, the number of symbols corresponding to this offset.

2. The delineation method of claim 1, wherein the number of symbols of the data stream between two detections of successive similar sequences is stored in order to determine length information.

3. The delineation method of claim 2, wherein the constructed sequence SP comprises symbols that are contiguous in the incoming data stream or non-contiguous.

4. The delineation method of claim 3, wherein the searching comprises opening of an analysis window of a length equal to the length F of the constructed sequence SP in order to analyze the sequences of the incoming data stream circulating in the analysis window, calculating a detection threshold (q) estimating an optimum threshold ($\eta_{opt}$), measuring a similarity between an analyzed sequence and the constructed sequence SP, and detecting a similar sequence occurring when the measured similarity is greater than or equal to the optimum threshold $\eta_{opt}$.

5. The delineation method of claim 4, wherein the searching is performed continuously by sliding the analysis window in the incoming data stream after each analysis of a sequence of length F.

6. The delineation method of claim 5, wherein the sliding of the analysis window corresponds to a symbol-by-symbol, or byte-by-byte, or bit-by-bit displacement in the incoming data stream.

7. A delineation device to delineate a data stream transmitted by a communication system using a multilayer protocol stack, comprising:
- an input for receiving a data stream comprising data packets with protocol header fields, the protocol header fields comprising fields whose content is constant for all the data packets of the stream;
- means for constructing, from the received incoming data stream, by a learning process, at least one sequence (SP), the constructed sequence SP comprising subsets of bits whose content is constant and belong to different protocol header fields of the received incoming data stream;
- means for searching for and detecting sequences similar to the constructed sequence SP, the non-similar sequences not being retained;
- means for determining positions of the similar sequences that have been detected; and
- means for storing the position of the similar sequences that have been detected in order to determine information with which to delineate the incoming data stream wherein the subsets of bits of the constructed sequence SP have known relative positions, wherein the means for storing the positions of the similar sequences that have been detected are configured to save said positions in a stream of successive similar sequences in order to deduce a start of packets, and wherein, when the data of the incoming data stream are in symbol form, and one of the similar sequences does not begin at a start of a header field and includes an offset relative to the start, the offset corresponding to a number of symbols, the start position of the corresponding packet is estimated by deducing, from the position of said similar sequence, the number of symbols corresponding to the offset.

8. The delineation device of claim 7, wherein the means for searching for the sequences corresponding to the constructed sequence SP and detecting similar sequences, comprises:
- a window of length equal to a length F of the constructed sequence SP, in order to analyze, in the incoming data stream, the sequences circulating in the window;
- means for calculating an optimum threshold ($\eta_{opt}$); and
- means for measuring similarity between an analyzed sequence and the constructed sequence SP and for detecting a similar sequence, the detecting occurring when the measured similarity is greater than or equal to the optimum threshold ($\eta_{opt}$).

9. The delineation device of claim 8, wherein a sliding window is displaced in the incoming data stream after each analysis of a sequence of a predetermined length F made up of the received symbols indexed from i to i+F−1, the indices i and i+F−1 corresponding to minimum and maximum limits establishing a length of the sliding window.

10. The delineation device of claim 9, wherein the sliding window is displaced corresponding to a symbol-by-symbol, byte-by-byte, or bit-by-bit displacement in the incoming data stream.

11. A data stream communication system comprising a receiver, wherein the receiver comprises a device for delineating the received data stream as claimed in claim 7.

12. The communication system of claim 11, wherein the delineation device is placed before a transmission error correction device.

13. The communication system of claim 12, wherein said communication system is a satellite communication system.

14. The communication system of claim 12, wherein said communication system uses ATM-over-ADSL links.

* * * * *

UNITED STATES PATENT AND TRADEMARK OFFICE
CERTIFICATE OF CORRECTION

| | | |
|---|---|---|
| PATENT NO. | : 8,582,600 B2 | Page 1 of 1 |
| APPLICATION NO. | : 12/918588 | |
| DATED | : November 12, 2013 | |
| INVENTOR(S) | : Juan Cantillo et al. | |

It is certified that error appears in the above-identified patent and that said Letters Patent is hereby corrected as shown below:

On the Title Page

For Item "(75) Inventors:"

Please replace "Isabelle Buret, Toulouse (FR)" with --Isabelle Buret, Plaisance Du Touch (FR)--

Signed and Sealed this
First Day of April, 2014

Michelle K. Lee
*Deputy Director of the United States Patent and Trademark Office*